Patented Nov. 8, 1927.

1,648,867

UNITED STATES PATENT OFFICE.

GEORGE I. RAY, OF CHARLOTTE, NORTH CAROLINA, ASSIGNOR TO RADIATOR SPECIALTY COMPANY, OF CHARLOTTE, NORTH CAROLINA, A CORPORATION OF NORTH CAROLINA.

COMPOSITION FOR HOT-WATER SYSTEMS.

No Drawing. Application filed April 12, 1927. Serial No. 183,241.

This invention relates to improved means for stopping leaks in hot water circulating systems, and comprises a composition for effecting the permanent sealing of leaks in such systems, and the prevention of the formation on the interior of the system of any matter which will in any way interfere with the proper functioning of the system.

An object of this invention is to provide a composition for stopping leaks in hot water circulating systems by permanently sealing the said leaks, and at the same time keeping the interior of the system in good condition.

Another object of my invention is to provide a composition for stopping leaks in hot water circulating systems which will act to permanently seal the leaks, and will also remove all scum and oil from the interior walls of the system.

I attain the above stated objects by placing in the hot water circulating system, after the same has been partially filled with water, a composition composed of aluminum, flax seed meal, ammonium carbonate and soap in about the following proportions:

| | Per cent. |
|---|---|
| Aluminum | 15 |
| Flax seed meal | 60 |
| Ammonium carbonate | 8 |
| Soap | 17 |

I desire it to be understood that the above proportions may be varied greatly without materially affecting the action of the composition, and without departing from the spirit of the invention.

Although I do not desire to be bound by the statements which follow, as to the actions and reactions which take place when my composition is placed in a hot water circulating system, I offer the following explanation of what I think happens:

The ammonium carbonate dissolves soon after it is placed in the water in the hot water circulating system, and a portion of the flax seed meal also dissolves, and the soap goes into colloidal solution. The ammonium carbonate reacts with the water to form ammonium hydroxide and ammonium bi-carbonate. These substances are mildly alkaline and would cause the mixture to contain ammonium carbonate, which is very desirable for use in automobile engines in which the cylinder head is made of aluminum, as the aluminum would not be greatly affected. The insoluble portions of the mixture would be suspended by the deflocculating properties of the soap, primarily, tho the mucilaginous matter in the flax seed meal and the ammonium carbonate have some value along this line. The leaks in the system would be stopped by the undissolved portions of the flax seed meal and the aluminum lodging in the leaks and being there cemented by the mucilage in the flax seed meal and also by the aluminum soap and the aluminum hydroxide which would be formed in small quantities.

The alkalinity of the ammonium carbonate is sufficient to prevent any decomposition of the soap into fatty acids which would tend to accumulate in the tubes of an automobile radiator should the composition be used in this type of system, and the ammonium carbonate also prevents the flax seed meal from souring and producing acidity in the mixture.

The derging action of the last two ingredients is good, and these properly stimulate the soap and keep the oil emulsified and prevents the same from sticking to the inside walls of the system. The oxidization of the oil globules also aids in cementing the particles in the leak and makes the seal more permanent.

The ammonium carbonate also acts as an insecticide due to the fact that it gives off fumes of ammonia and insect life cannot live in the flax seed meal when the ammonium carbonate is placed in the mixture.

Due to the fact that alkalinity of this composition is low, it is very desirable to use in hot water systems in which there are aluminum parts.

In the specification I have set forth a preferred embodiment of my invention, and although specific terms are employed, they are used in a generic and descriptive sense and not for purposes of limitation, the scope of the invention being set forth in the appended claims:

I claim:

1. A composition for stopping leaks in hot water circulating systems comprising a mixture of aluminum, flax seed meal, ammonium carbonate and soap.

2. A composition for stopping leaks in hot water circulating systems comprising a mixture of aluminum, flax seed meal, and ammonium carbonate.

In testimony whereof I affix my signature.

GEORGE I. RAY.